June 2, 1925.  1,540,038
M. H. SPIELMAN
ELECTRIC MOTOR
Filed July 18, 1921     2 Sheets-Sheet 1
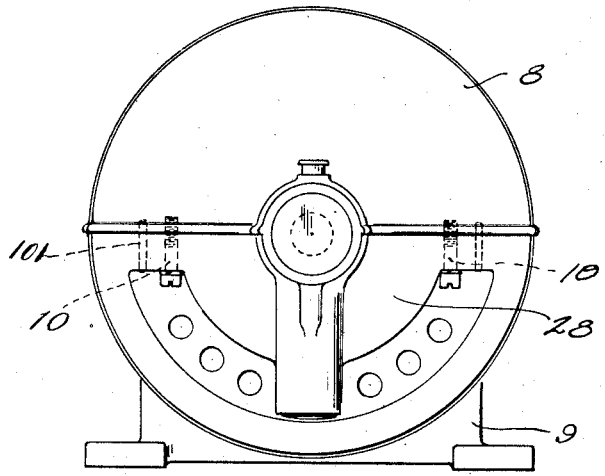
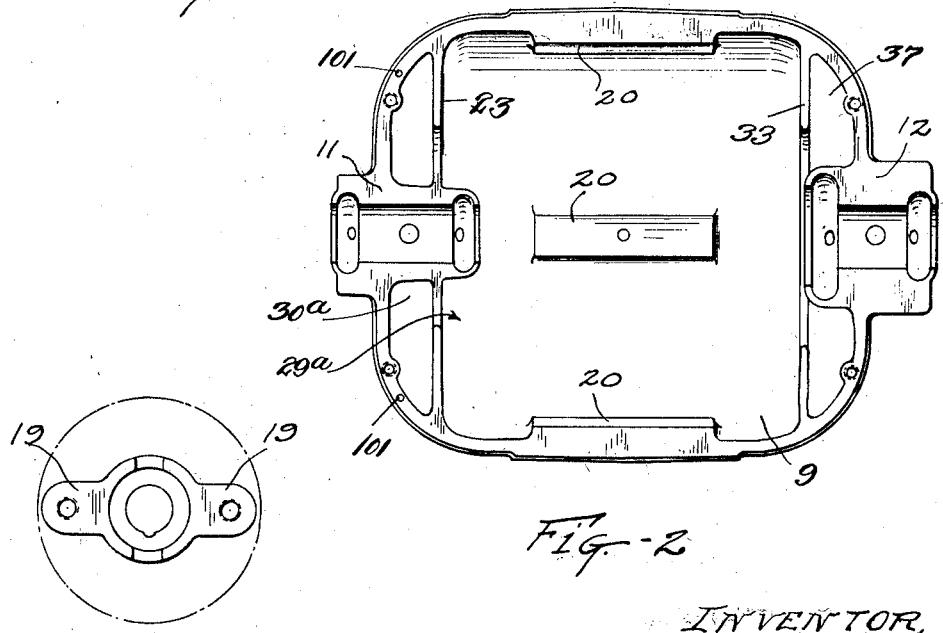
INVENTOR,
Milton H Spielman,
BY Bates & Macklin,
ATTORNEYS June 2, 1925.　　　　　　　　　　　　　　1,540,038
M. H. SPIELMAN
ELECTRIC MOTOR
Filed July 18, 1921　　　2 Sheets-Sheet 2

INVENTOR
Milton H. Spielman
BY Bates & Macklin
ATTORNEYS

Patented June 2, 1925.

1,540,038

UNITED STATES PATENT OFFICE.

MILTON H. SPIELMAN, OF CLEVELAND, OHIO, ASSIGNOR TO THE DOMESTIC ELECTRIC COMPANY, OF CLEVELAND, OHIO, A CORPORATION OF OHIO.

ELECTRIC MOTOR.

Application filed July 18, 1921. Serial No. 485,684.

*To all whom it may concern:*

Be it known that I, MILTON H. SPIELMAN, a citizen of the United States, residing at Cleveland, in the county of Cuyahoga and State of Ohio, have invented a certain new and useful Improvement in Electric Motors, of which the following is a full, clear, and exact description, reference being had to the accompanying drawings.

This invention relates to improvements in electric motors and particularly to frame construction and has for its objects the provision of a simple, efficient and economical frame construction, including unique characteristics of ventilation and lubrication.

In the construction of motor casings of the fractional horse power type of motor, it has been customary to divide the housing transversely with relation to the armature shaft into three or more members, comprised essentially of a central member containing a field winding and end closure members secured thereto. Such a construction requires a very accurate machining and joining of these parts, resulting in a commensurately large expenditure of labor incident to the obtaining of proper alignment of bearings and uniform clearance between the armature and field laminations.

Among other objects of my invention are; the provision of a simple motor frame construction eliminating the necessity of accurate machine shop operations; the simplifying of assembling steps so that the field windings may be placed in the frame as a unit and the housing subsequently assembled about it; a novel, simple and economical construction of the bearings and lubricating means therefor; the arrangement of a large amount of ventilating area in the ends of the motor frame while so closing the frame as to prevent splashing of water thereinto; the arrangement of end frame members to obtain greater strength and also to use simple casting methods for making the frame members.

Other objects and features of my invention will become more apparent in connection with an illustration of the invention appearing in the accompanying drawings. The esential characteristics are summarized in the claim.

Figure 4:
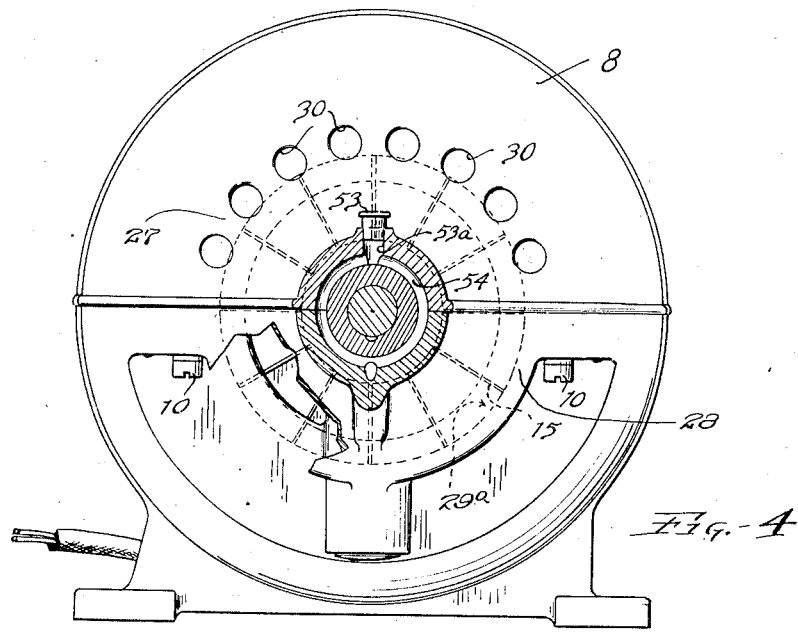
Figure 3:
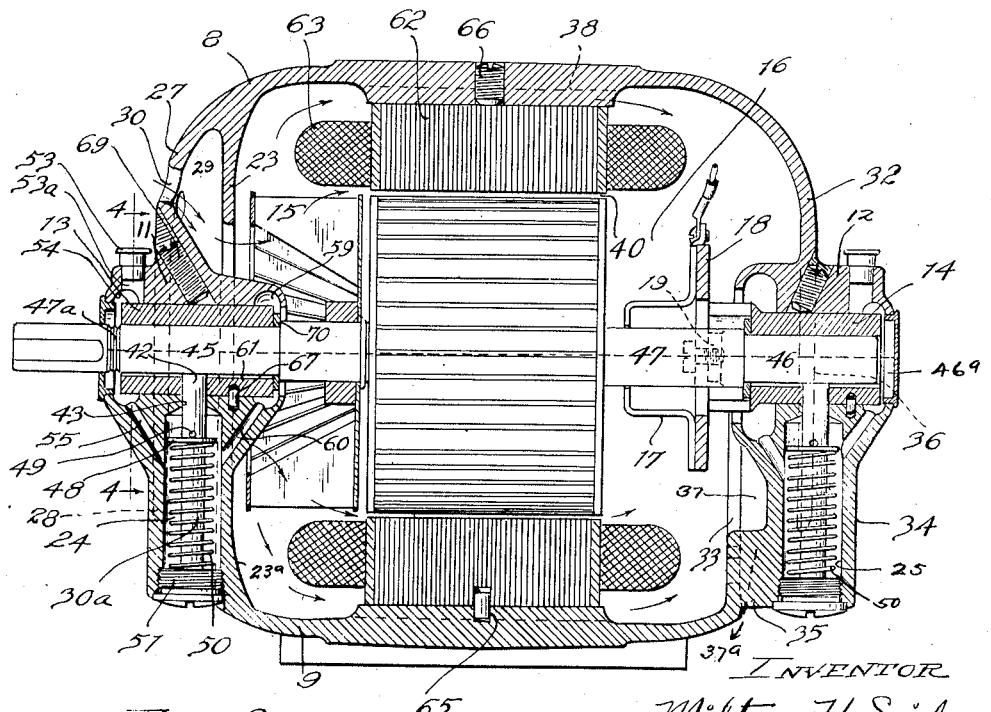

In the drawings, Fig. 1 is an end elevation of the assembled motor; Fig. 2 is a plan view of the base portion of the casing with the bearings, armature and field windings removed; Fig. 3 is a cross sectional elevation through the center of the motor, while Fig. 4 is an end cross sectional elevation, substantially along the line 4—4 of Fig. 3. Fig. 5 is an end view of one of the bearings.

I have shown in the drawings a single phase induction type of motor. The frame is comprised substantially of an upper housing member 8 and a lower housing member 9, joined in a horizontal plane passing through the center of the armature shaft. These members may be properly aligned by suitable dowel pins 101 and may be securely maintained in position by any convenient means, such as the screws 10. Positioned at each end of the housing members and integral therewith are bearing supports 11 and 12 which are adapted to support bearing members 13 and 14 respectively. The usual ventilating fan 15 may be positioned to one side of the armature, while on the opposite side a sufficient space 16 may be provided for a centrifugal switch (not shown) the contact members of which are adapted to bear upon collector rings 17. These rings may be rigidly secured to an insulating member 18 which is adapted to be secured to lugs 19 cast integral with the bearing member 14.

I have found that by having the motor housing parted in a horizontal plane passing through the center of the armature shaft several expensive production steps may be eliminated. Both housing members may be finished by the same production tools when thus parted. To further facilitate speed and accuracy in the production of the motor housing, I have eliminated the necessity of finishing the entire inner surface of the casing by providing separated supporting pads or ribs 20 on both housing members which may be formed integrally with the casing. I prefer to locate these ribs in such a manner that a finished diameter, for gaging purposes, may be obtained in both housing members when the same are being machined. As shown in Fig. 2, three ribs are provided in the lower housing member 9, which are annularly spaced apart at substantially 90 degrees, so that two of the ribs are located along the joining faces of this member. The upper housing member may have three similarly spaced ribs, whereby the inner faces of the ribs of the housing members may be accurately machined by a milling operation and then gauged without necessitating a premature assembling of the housing members for a boring operation. In this arrangement when the motor is assembled an air space is obtained between the motor housing and the field laminations for the passage of air drawn into the housing by the fan 15.

To confine the movement of the air to these spaces, I have provided an inner end wall 23 extending inwardly toward the armature shaft to an arc substantially within the outer diameter of the fan blades. This inner wall extends in an annular direction on the lower housing member about the armature shaft and merges with the walls of an oil reservoir 24, as shown at 23ª. The upper portion of the walls of this reservoir may be arranged to serve as a bearing support for a bearing member 13.

The upper half 11 of the bearing support may be cast integral with an outer wall 27 which constitutes an end closing portion of the upper housing member 8. The lower portion of the housing may have a similar wall 28 which may be arranged to meet the upper wall 27 along the parting line of the housing and which may also serve to strengthen the upper half 11 of the support. This wall may have a ventilating opening extending across the lower portion thereof as indicated by arrow 29ª. Thus an air space 29 is provided between these end walls through which the air may pass to the fan blades. Suitable openings 30 may be formed in the upper portion of the housing wall 27 through which the air may also pass into the space 29.

The other end of the housing may be arranged in a similar manner whereby the upper half 12 of the bearing support may be integral with an outer wall member 32 symmetrical in appearance with the wall 27. An inner wall 33 formed in the lower housing member may serve the same purpose as the wall 23ª. The upper portions of the oil reservoir walls 34 may also serve to strengthen the bearing support of the bearing 14, while the lower portion 35 thereof may be cast integral with the inner end wall 33 of the lower housing member 9. The outer wall 32 may extend downwardly to meet the portion 36 along the parting line of the housing member, thus an open space 37 is provided between the wall members for the escape of the air drawn in the motor housing by the fan 15.

It is to be seen that ingress of the air is through the openings 30 formed in the end wall 27 of the upper housing member, see Figs. 3 and 4 and the opening 30ª formed in the lower housing member into the space 29, see Figs. 2 and 3. It may then pass to the inner diameter of the fan then through the fan 15 by which it is forced through the spaces 38 between the field laminations and housing, whence it may pass into the space 37 and out of the housing by passing between the end walls of lower housing member 9 as indicated by the arrow 37ª. The air may also pass through the clearance space 40 between the armature and the field laminations. Thus I obtain an air circulation around the outer edges of the field laminations, as well as through the armature clearance.

By arranging the end walls in the foregoing described manner, a symmetrical appearance of the assembled motor is obtained. The inner wall serves as a baffle to direct the incoming air to the center of the fan, while the air upon leaving the outer edge of the fan is directed upwardly between the field laminations and the housing by the same wall. The outer wall gives strength to the bearing support and acts as a shield to prevent the entry of water and other foreign matter.

I have provided felt members 42 in the oil reservoirs 24 and 25 which are arranged to pass through suitable openings 43 formed in the underside of the cylindrical bearing members 13 and 14. These felt wicks may be maintained in contact with the bearing portions 45 and 46 of the armature shaft 47 by any convenient means, such as spring members 50 and washers 48. These washers may bear upon pins 49 passing through the felt wicks which are thus maintained in resilient contact with the shaft under all conditions. Suitable plug members 51 provided with tapered threads to prevent the leakage of the lubricant from the reservoirs may serve as a seat for the spring members.

I have provided oil cups 53 positioned in suitable openings 53ª communicating with the annular grooves 54 located near the outer ends of the bearings. These grooves may be connected with the oil reservoir by a suitable passageway 55 formed in the lower housing member. The inner ends of the bearing support may have similar annular grooves 59 likewise connected to the oil reservoir by a passageway 60. A suitable groove 61 may be formed in the lower portion of the bearing surface of the bearing member 13 to permit the distribution of the lubricant along the bearing portions of the armature shaft. Thus constant movement of the lubricant is obtained, for it is raised out of the reservoir by the wick member 42 and distributed along the bearings to the ends thereof, whence it is trapped by the grooves 54 and 59 and returned to the reservoir by the passageways 55 and 60, communicating therewith. The bearing support for the bearing member 14 may be arranged in a similar manner.

Suitable serrations 47ª may be formed near the driving end of the armature shaft to restrict the movement of the lubricant toward the outer end of the shaft. Oil leakage may be prevented at the other end of the housing by a cup member 46ª which may serve to close the end opening in the housing.

In assembling the motor it is to be readily seen that the field laminations 62 and the field coil 63 may be assembled as a unit, after which they may be held in accurate position within the housing by the bearing pads 20 of the upper and lower housing members 8 and 9.

To further facilitate the assembling of the motor frame, I have provided a dowel pin 65 in the central portion of the bottom pad, and a clamping member 66 passing through the top pad whereby the field may be accurately positioned and secured within the motor housing. I have also provided dowel pins 67 in the lower housing member which serve to maintain the bearings 13 and 14 in longitudinal position, while clamping members 69 serve to oppose the end thrust of the armature shaft. Suitable washers 70 may be carried by the armature shaft against the ends of which the bearing members 13 and 14 may thrust.

It is to be noted that all of the dowel pin members are located in the lower housing member. This arrangement is of particular advantage as the holes in which the dowel pins are secured may be accurately formed in both housing members by the use of one set of tools by drilling through the outer end wall of the lower housing member after the motor is assembled, thus assuring the greatest degree of accuracy in the assembling of the bearing and housing members.

After the motor has been in service the field may be removed from the housing and be replaced therein without in any way affecting the proper assembling of the motor. The bearing members are of the most simple construction, thus insuring an accurate, as well as an economical production, while ample lubrication thereof is insured by a very economical and efficient arrangement of the bearing supports.

By providing supporting means on one of the bearing members adapted to maintain the commutating members of the switch, I have eliminated several machining operations on the motor frame.

Also by parting the housing along a horizontal plane as described, it is possible to finish the joining surface of the upper and lower housing member by the surface grinding operation which is both extremely accurate and economical.

Having thus described my invention, I claim:—

A motor frame formed of a top member and a base member joined along a horizontal plane through the center of the frame, said members each having longitudinally extending ribs formed along the joining edges thereof and a similarly extending rib formed intermediate the edge ribs and having outer end walls terminating in bearing portions, the upper member having an annular inner wall spaced apart from the bearing structure of the frame and the base member having an annular inner wall at the opposite end of the frame spaced apart from the bearing structure.

In testimony whereof, I hereunto affix my signature.

MILTON H. SPIELMAN.